(12) United States Patent
Nagano

(10) Patent No.: US 11,312,842 B2
(45) Date of Patent: Apr. 26, 2022

(54) RUBBER COMPOSITION, RUBBER COMPOSITION FOR TIRES, AND TIRE

(71) Applicant: BRIDGESTONE CORPORATION, Tokyo (JP)

(72) Inventor: Daijiro Nagano, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 16/767,941

(22) PCT Filed: Nov. 28, 2018

(86) PCT No.: PCT/JP2018/043815
§ 371 (c)(1),
(2) Date: May 28, 2020

(87) PCT Pub. No.: WO2019/107428
PCT Pub. Date: Jun. 6, 2019

(65) Prior Publication Data
US 2020/0369858 A1 Nov. 26, 2020

(30) Foreign Application Priority Data
Nov. 30, 2017 (JP) .............................. JP2017-230591

(51) Int. Cl.
| | | |
|---|---|---|
| C08L 7/00 | (2006.01) | |
| B60C 1/00 | (2006.01) | |
| B60C 11/00 | (2006.01) | |
| C08K 3/06 | (2006.01) | |
| C08K 5/40 | (2006.01) | |
| C08K 5/435 | (2006.01) | |
| C08K 5/44 | (2006.01) | |
| C08K 5/47 | (2006.01) | |

(52) U.S. Cl.
CPC .............. C08L 7/00 (2013.01); B60C 1/0016 (2013.01); B60C 11/0008 (2013.01); C08K 3/06 (2013.01); C08K 5/40 (2013.01); C08K 5/435 (2013.01); C08K 5/44 (2013.01); C08K 5/47 (2013.01)

(58) Field of Classification Search
CPC ... B60C 11/0008; B60C 11/02; B60C 1/0016; C08K 5/435; C08K 3/06; C08K 5/40; C08K 5/44; C08K 5/47; C08K 2201/019; C08L 7/00
See application file for complete search history.

(56) References Cited

U.S. PATENT DOCUMENTS

| | | | |
|---|---|---|---|
| 5,159,009 A | 10/1992 | Wolff et al. | |
| 5,184,779 A | 2/1993 | Wolff et al. | |
| 7,987,880 B2 * | 8/2011 | Nakamura | C08L 21/00 152/209.1 |
| 2014/0102611 A1 | 4/2014 | Miyazaki | |
| 2014/0166175 A1 | 6/2014 | Kimura | |
| 2014/0243448 A1 * | 8/2014 | Lesage | C08L 7/00 523/157 |
| 2015/0344637 A1 | 12/2015 | Aamer et al. | |

FOREIGN PATENT DOCUMENTS

| | | | |
|---|---|---|---|
| JP | 2-248442 A | 10/1990 | |
| JP | 4-233976 A | 8/1992 | |
| JP | 6-136285 A | 5/1994 | |
| JP | 2005-105154 A | 4/2005 | |
| JP | 2009-292310 A | 12/2009 | |
| JP | 2015-526541 A | 9/2010 | |
| JP | 2013-032440 A | 2/2013 | |
| JP | 2013-064102 A | 4/2013 | |
| JP | 2013-159769 A | 8/2013 | |
| JP | 2015-093880 A | 5/2015 | |
| JP | 2015-218251 A | 12/2015 | |
| JP | 2016-008286 A | 1/2016 | |
| JP | 2016-014113 A | 1/2016 | |
| JP | 2016-014133 A | 1/2016 | |
| JP | 2016060837 A | * | 4/2016 |
| JP | 2016-084405 A | 5/2016 | |
| JP | 2016-194018 A | 11/2016 | |
| JP | 2016-216671 A | 12/2016 | |

OTHER PUBLICATIONS

English language machine translation of JP 2016-060837 (Year: 2016).*
International Search Report for PCT/JP2018/043815 dated Feb. 5, 2019 (PCT/ISA/210).

* cited by examiner

Primary Examiner — Angela C Scott
(74) Attorney, Agent, or Firm — Sughrue Mion, PLLC

(57) ABSTRACT

Provided is a rubber composition having a high vulcanization rate and excellent in storage stability. The rubber composition contains a rubber component that contains at least one type of a dienic rubber, a filler, a vulcanizing agent, a compound represented by a formula (1), a compound represented by a formula (2), and a vulcanization accelerator except the compound represented by the formula (1), wherein the total amount of the vulcanization accelerator and the compound represented by the formula (1) is 1.3 to 2.0 parts by mass relative to 100 parts by mass of the rubber component.

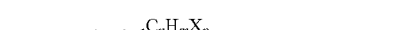

(1)

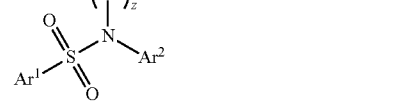

(2)

16 Claims, No Drawings

RUBBER COMPOSITION, RUBBER COMPOSITION FOR TIRES, AND TIRE

CROSS REFERENCE TO RELATED APPLICATIONS

This application is a National Stage of International Application No. PCT/JP2018/043815 filed Nov. 28, 2018, claiming priority based on Japanese Patent Application No. 2017-230591, filed Nov. 30, 2017.

TECHNICAL FIELD

The present invention relates to a rubber composition, a rubber composition for tires, and a tire.

BACKGROUND ART

Recently from the viewpoint of environmental load reduction, a move to repair and reuse tires damaged by injury is spreading.

Heretofore, for repairing and retreading damaged tires, there has been employed a method where a damaged tire is taken in a factory, the tread rubber of the used tire is polished to form a base tire, a cushion rubber is arranged on the base tire, a precure tread is stuck to the cushion rubber, and the precure tread-attached base tire is heated in a vulcanizing pan. A cushion rubber has a role of fixing a precure tread on a base tire, and from the viewpoint of shortening the retreading time, such a cushion rubber is required to have a quality of being vulcanized within a short period of time and to have, on the other hand, a hardly scorching function.

For improving the function, for example, there is disclosed a method for producing a rubber composition including a step of kneading a dienic rubber and a 1,3-diphenylguanidine to prepare a kneaded product and a step of further kneading the kneaded product with a 2-mercaptobenzothiazole and a dithiocarbamate-based accelerator having a benzene ring at the terminal (for example, see PTL 1).

In addition, for example, there is also disclosed a method for producing a rubber composition for retreaded tire tread capable of improving abrasion resistance and cutting and chipping resistance of vulcanized rubber, which includes mixing and dispersing a dienic rubber, carbon black, a dihydrazide compound and sulfur using an airtight mixer and in which the dihydrazide compound and the sulfur are put into the airtight mixer both at the same time (for example, see PTL 2).

In addition, for example, there is also disclosed a method for producing a cushion rubber for retreaded tires excellent in pressure-sensitive adhesiveness to a vulcanized rubber member and capable of improving the fracture property and the low-heat-generation property of a vulcanized rubber, wherein the cushion rubber for retreaded tires contains a dienic rubber and a filler, the filler contains a surface-treated calcium carbonate that has been surface-treated with at least one selected from the group consisting of a fatty acid, a rosin acid and a silane coupling agent, the nitrogen adsorption specific surface area ($N_2SA$) of the surface-treated calcium carbonate is 20 $m^2/g$ or more, and the content of the surface-treated calcium carbonate is 1 to 7 parts by mass relative to 100 parts by mass of the dienic rubber (for example, see PTL 3).

Further, for example, for improving durability of retreaded tires, there is disclosed a method of formulating a cushion rubber composition for retreated tires to contain 20 to 100 parts by mass of carbon black and 5 to 20 parts by mass of a modified liquid rubber relative to 100 parts by mass of a dienic rubber (for example, see PTL 4).

CITATION LIST

Patent Literature

PTL 1: JP 2016-8286 A
PTL 2: JP 2015-93880 A
PTL 3: JP 2016-14133 A
PTL 4: JP 2016-84405 A

SUMMARY OF INVENTION

Technical Problem

In the tire retreading methods described in PTLs 1 to 4, damaged tires are required to be taken in a large-scale factory equipped with a large heating apparatus.

Recently even small-sized maintenance shops and retail shops not equipped with such large facilities are required to repair and retread damaged tires.

For small-sized maintenance shops and retail shops, previously prepared rubber compositions are distributed in the market, and stored by small-sized maintenance shops and retail shops, and are used at the time of need. Namely the time from preparation of a rubber composition to actual use thereof tends to be longer in such small-sized maintenance shops and retail shops, as compared with the time for tire repairing in large-scale factories. The rubber compositions described in PTLs 1 to 4 cure when left for such a long period of time in market circulation, and therefore could not be used for tire repairing.

In addition, in small-sized maintenance shops and retail shops not equipped with facilities, the rubber composition buried in a damaged tire is required to be rapidly vulcanized even not using a large heating vessel.

In consideration of the above-mentioned situation, an object of the present invention is to solve the above-mentioned problems by providing a rubber composition and a rubber composition for tires excellent in storage stability and having a high vulcanization rate, and providing a tire using the composition.

Solution to Problem

<1> A rubber composition containing a rubber component that contains at least one type of a dienic rubber, a filler, a vulcanizing agent, a compound represented by a formula (1), a compound represented by a formula (2), and a vulcanization accelerator except the compound represented by the formula (1), wherein the total amount of the vulcanization accelerator and the compound represented by the formula (1) is 1.3 to 2.0 parts by mass relative to 100 parts by mass of the rubber component.

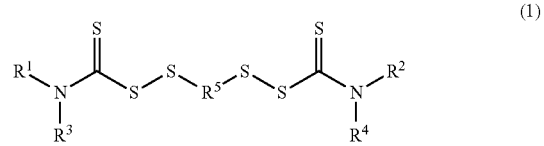

(1)

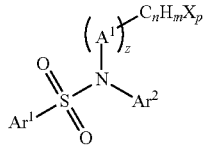

(2)

In the formula (1), $R^1$ to $R^4$ each independently represent a monovalent alkyl group having 1 to 18 carbon atoms, or a monovalent aryl group having 6 to 15 carbon atoms, $R^5$ represents a divalent alkyl group having 2 to 18 carbon atoms, and $R^1$ to $R^5$ may each independently further have a substituent.

In the formula (2), $A^1$ represents a divalent hetero atom, X represents a halogen atom, and two or more X's, if any, may be the same as or different from each other; z represents an integer of 0 to 5, n represents an integer of 1 to 5, m represents an integer of 0 or more, p represents an integer of 1 or more, provided that m+p=2n+1, and $Ar^1$ and $Ar^2$ each independently represent a monovalent aryl group having 6 to 15 carbon atoms which may further have a substituent.

<2> The rubber composition according to <1>, further containing a tackifier.

<3> The rubber composition according to <1> or <2>, wherein the vulcanization accelerator contains a sulfenamide-based vulcanization accelerator.

<4> The rubber composition according to any one of <1> to <3>, wherein the vulcanization accelerator contains a thiazole-based vulcanization accelerator.

<5> The rubber composition according to any one of <1> to <4>, wherein the rubber component contains a natural rubber.

<6> The rubber composition according to any one of <2> to <5>, wherein the content of the tackifier is more than 2.0 parts by mass and 10 parts by mass or less relative to 100 parts by mass of the rubber component.

<7> The rubber composition according to any one of <1> to <6>, wherein the vulcanizing agent is sulfur.

<8> The rubber composition according to any one of <4> to <7>, wherein the thiazole-based vulcanization accelerator contains a thiazole-based compound having two benzothiazolyl groups, and the ratio of the content (a) of the compound represented by the general formula (1) to the content (b) of the thiazole-based compound having two benzothiazolyl groups (a/b) is 0.5 to 1.7.

<9> The rubber composition according to any one of <1> to <8>, wherein the compound represented by the formula (1) is represented by the following formula (3).

(3)

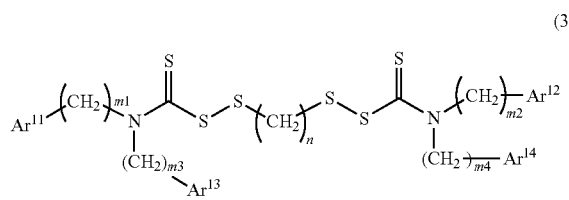

In the formula (3), $Ar^{11}$ to $Ar^{14}$ each independently represent a monovalent aryl group having 6 to 12 carbon atoms, n represents an integer of 2 to 12, m1 to m4 each independently represent an integer of 1 to 6, and $Ar^{11}$ to $Ar^{14}$ each may independently further have a substituent.

<10> The rubber composition according to any one of <1> to <9>, wherein the compound represented by the formula (2) is represented by the following formula (4).

(4)

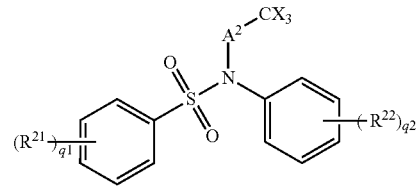

In the formula (4), $A^2$ represents an oxygen atom or a sulfur atom, X represents a halogen atom, three X's may be the same as or different from each other, $R^{21}$ and $R^{22}$ each independently represent an amino group or an alkyl group having 1 to 8 carbon atoms which may further have a substituent, and q1 and q2 each independently represent an integer of 0 to 5.

<11> A rubber composition for tires, using a rubber composition of anyone of <1> to <10>.

<12> A tire using a rubber composition for tires of <11>.

Advantageous Effects of Invention

According to the present invention, there can be provided a rubber composition and a rubber composition for tires having a high vulcanization rate and excellent in storage stability and also a tire.

DESCRIPTION OF EMBODIMENTS

<Rubber Composition>

The rubber composition of the present invention contains a rubber component containing at least one type of a dienic rubber, a filler, a vulcanizing agent, a compound represented by the formula (1), a compound represented by the formula (2), and a vulcanization accelerator except the compound represented by the formula (1), wherein the total amount of the vulcanization accelerator and the compound represented by the formula (1) is 1.3 to 2.0 parts by mass relative to 100 parts by mass of the rubber component.

(1)

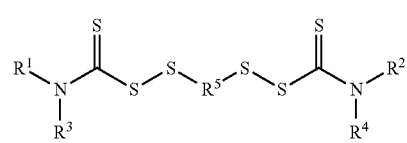

(2)

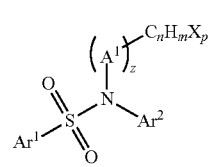

In the formula (1), $R^1$ to $R^4$ each independently represent a monovalent alkyl group having 1 to 18 carbon atoms, or a monovalent aryl group having 6 to 15 carbon atoms, $R^5$ represents a divalent alkyl group having 2 to 18 carbon atoms, and $R^1$ to $R^5$ may each independently further have a substituent.

In the formula (2), $A^1$ represents a divalent hetero atom, X represents a halogen atom, and two or more X's, if any may be the same as or different from each other; z represents an integer of 0 to 5, n represents an integer of 1 to 5, m represents an integer of 0 or more, p represents an integer of 1 or more, provided that m+p=2n+1, and $Ar^1$ and $Ar^2$ each independently represent a monovalent aryl group having 6 to 15 carbon atoms which may further have a substituent.

As described above, the rubber compositions for retreaded tires described in PTLs 1 to 4 are used when damaged tires are taken in a fully-equipped large-scale factory repaired and retreated therein, but much time is taken for repairing in a large-scale factory and therefore, a rubber composition for repairing is desired which enables repairing even in familiar small-sized maintenance shops or retail shops.

A rubber composition is buried in a tire damaged as partly ripped open or chipped, or such a defective part of a damaged tire is covered, and then the rubber composition for repairing is vulcanized to repair the tire.

The rubber composition and the rubber composition for tires of the present invention each contain a rubber component containing a dienic rubber, a filler, a vulcanizing agent, and further contain a compound represented by the formula (1) and a compound represented by the formula (2), and though the reason is not clear, vulcanization of the rubber composition of the type of the present invention may not go on even when the rubber composition is left as such for a long period of time from preparation thereof to distribution in the market and until storage, and the rubber composition thus has an excellent storage stability as flexible and well processable, while on the other hand, in use thereof, the rubber composition secures a high vulcanization rate and can be rapidly vulcanized.

In the above, a typical case of using the rubber composition of the present invention for repairing damaged tires is described but the rubber composition of the present invention is not limited to use for repairing tires and can be used for repairing all kinds of vulcanized products except tires.

Hereinunder the rubber composition, the rubber composition for tires and the tire of the present invention are described in detail.

[Rubber Component]

The rubber composition of the present invention contains a rubber component containing at least one type of a dienic rubber.

The rubber composition of the present invention is buried in a defective part of vulcanized rubber products such as typically tires, then vulcanized and integrated with the vulcanized rubber of the product to be a part of the product, and accordingly, the rubber composition is preferably well compatible with vulcanized rubber. A vulcanized rubber product is generally formed of a vulcanized rubber of a dienic rubber, and therefore the rubber composition is well compatible with the vulcanized rubber of a damaged product. When the two are integrated to be a product, the original product and the vulcanized rubber added by repairing therein hardly peel away to detract from the basic properties (strength, elasticity) of the original vulcanized rubber product.

The dienic rubber includes at least one type of a dienic rubber selected from the group consisting of a natural rubber (NR) and a synthetic dienic rubber. The rubber component may be modified.

Specifically the synthetic dienic rubber includes a polyisoprene rubber (IR), a polybutadiene rubber (BR), a styrene-butadiene copolymer rubber (SBR), a butadiene-isoprene copolymer rubber (BIR), a styrene-isoprene copolymer rubber (SIR), a styrene-butadiene-isoprene copolymer rubber (SBIR), and modified rubbers thereof.

The dienic rubber is preferably any of a natural rubber, a polyisoprene rubber, a styrene-butadiene copolymer rubber, a polybutadiene rubber, and an isobutylene isoprene rubber, and modified rubbers thereof, and is more preferably a natural rubber and a polybutadiene rubber. One alone or two or more kinds of dienic rubbers may be used either singly or as blended.

The rubber component may contain only either one of a natural rubber and a synthetic dienic rubber, or may contain both the two.

A tire has a high natural rubber ratio, and therefore from the viewpoint of good compatibility with tire products and being hardly damaged, the rubber component preferably contains a natural rubber.

The proportion of a natural rubber in the rubber component is preferably 55% by mass or more, more preferably 65% by mass or more, even more preferably 75% by mass or more. The upper limit of the natural rubber in the rubber component is 100% by mass.

The rubber component may contain a non-dienic rubber and a modified rubber thereof within a range not detracting from the advantageous effects of the present invention.

[Filler]

The rubber composition of the present invention contains a filler.

When the rubber composition contains a filler, the strength of the vulcanized rubber part formed by vulcanizing the rubber composition of the present invention can be increased. Therefore the basic properties (strength, flexibility) of vulcanized rubber products after retreading of vulcanized rubber products are hardly worsened.

The filler is not specifically limited, and for example, a reinforcing filler for reinforcing rubber compositions can be used. Examples of the reinforcing filler include silica, carbon black and so on.

(Silica)

Silica is not specifically limited, and examples thereof include wet method silica (hydrous silicate), dry method silica (silicic anhydride), calcium silicate and aluminum silicate, and above all, wet method silica is preferred.

The BET specific surface area of wet method silica is preferably 40 to 350 $m^2/g$, more preferably 150 to 300 $m^2/g$, even more preferably 200 to 250 $m^2/g$. When the BET specific surface area of silica falls within the range, both rubber reinforcing performance and silica dispersibility in a rubber component can be satisfied. From this viewpoint, the BET specific surface area of silica is further more preferably within a range of 80 to 300 $m^2/g$.

Commercial products of silica of the type include "Nipsil AQ" and "Nipsil KQ) (both trade names by Tosoh Silica Corporation), and "Ultrasil VN3" (trade name by Evonik Japan). One kind alone or two or more kinds of silica may be used either singly or as combined.

(Carbon Black)

Not specifically limited, any carbon black can be suitably selected and used depending on the intended purpose. Preferred examples of carbon black include FEF, SRF, HAF, ISAF, and SAF grade ones; and HAF, ISAF, and SAF grade ones are more preferred.

The content of the filler in the rubber composition of the present invention is preferably 10 to 100 parts by mass relative to 100 parts by mass of the rubber component, more preferably 30 to 80 parts by mass.

When the content of the filler in the rubber composition is 10 parts by mass or more relative to 100 parts by mass of the rubber component, the resultant vulcanized rubber such as tires can have excellent abrasion resistance without lowering the strength thereof, and when the content is 100 parts by mass or less, the rubber composition is still flexible even after distribution in commerce, and can be therefore handled with ease in maintenance shops or retail shops.

As the filler, any one of silica and carbon black may be used, or both silica and carbon black may be sued, but preferably the content of silica in the rubber composition is 0 to 60 parts by mass relative to 100 parts by mass of the rubber component.

[Vulcanizing Agent]

The rubber composition of the present invention contains a vulcanizing agent.

The vulcanizing agent is not specifically limited, and in general, sulfur is used. Examples thereof include powdery sulfur, precipitated sulfur, colloidal sulfur, surface-treated sulfur, and insoluble sulfur.

In the rubber composition of the present invention, the content of the vulcanizing agent is preferably 0.1 to 10 parts by mass relative to 100 parts by mass of the rubber component. When the content is 0.1 parts by mass or more, vulcanization can sufficiently go on, and when the content is 10 parts by mass, aging of vulcanized rubber can be suppressed.

The content of the vulcanizing agent in the rubber composition is preferably 0.5 to 8 parts by mass relative to 100 parts by mass of the rubber component, more preferably 1 to 6 parts by mass.

[Compound Represented by Formula (1)]

The rubber composition of the present invention contains a compound represented by the formula (1).

The compound represented by the formula (1) is a compound capable of functioning as a vulcanization accelerator, and is a thiuram-based vulcanization accelerator. When the rubber composition of the present invention contains a compound represented by the formula (1), the vulcanization rate in repairing vulcanized rubber such as tires using the rubber composition after distributed in the market can be increased and therefore tires can be readily repaired even in small-sized maintenance shops and retail shops not equipped with facilities.

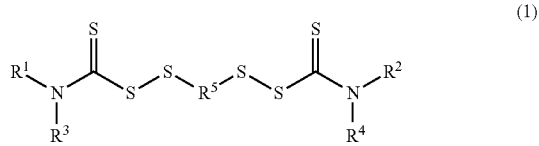

(1)

In the formula (1), $R^1$ to $R^4$ each independently represent a monovalent alkyl group having 1 to 18 carbon atoms, or a monovalent aryl group having 6 to 15 carbon atoms, $R^5$ represents a divalent alkyl group having 2 to 18 carbon atoms, and $R^1$ to $R^5$ may each independently further have a substituent.

The monovalent alkyl group having 1 to 18 carbon atoms represented by $R^1$ to $R^4$ may be linear, branched or cyclic. Specifically, examples thereof include a methyl group, an ethyl group, a propyl group, an isopropyl group, a n-butyl group, a tert-butyl group, a hexyl group, a cyclohexyl group, a n-octyl group, a n-decyl group, a n-dodecyl group, and a n-octadecyl group.

The alkyl group represented by $R^1$ to $R^4$ is preferably linear or branched, more preferably linear. The carbon number of the alkyl group is preferably 1 to 12, more preferably 1 to 6, even more preferably 1 to 4, and further more preferably 1 to 2.

The monovalent aryl group having 6 to 15 carbon atoms represented by $R^1$ to $R^4$ includes a phenyl group, a naphthyl group, an anthracenyl group, and a phenanthrenyl group.

The carbon number of the aryl group represented by $R^1$ to $R^4$ is preferably 6 to 12, more preferably 6 to 10.

The divalent alkyl group having 2 to 18 carbon atoms represented by $R^5$ may be linear, branched or cyclic. Specifically, examples thereof include an ethylene group, a propylene group, a dimethylmethylene group, a n-butylene group, a 2,2-dimethylpropylene group, a hexylene group, a cyclohexylene group, a n-octylene group, a n-decylene group, a n-dodecylene group, and a n-octadecylene group.

$R^5$ is preferably linear or branched, and more preferably linear.

The carbon number of $R^5$ is preferably 2 to 14, more preferably 3 to 12, even more preferably 4 to 10.

The substituent that $R^1$ to $R^5$ may further have includes a monovalent alkyl group having 1 to 18 carbon atoms, a monovalent aryl group having 6 to 15 carbon atoms, a hydroxy group, a carboxy group, an amino group, and a halogen atom. For specific examples of the monovalent alkyl group having 1 to 18 carbon atoms and the monovalent aryl group having 6 to 15 carbon atoms, reference may be made to those described hereinabove as specific examples of the monovalent alkyl group having 1 to 18 carbon atoms and the monovalent aryl group having 6 to 15 carbon atoms for $R^1$ to $R^4$.

The substituent is preferably a monovalent alkyl group having 1 to 18 carbon atoms of a monovalent aryl group having 6 to 15 carbon atoms, more preferably a monovalent aryl group having 6 to 15 carbon atoms, even more preferably an aryl group having 6 to 12 carbon atoms, further more preferably an aryl group having 6 to 10 carbon atoms.

From the viewpoint of more increasing the vulcanization rate of the rubber composition in repairing vulcanized rubber such as damaged tires, the compound represented by the formula (1) is preferably represented by the following formula (3).

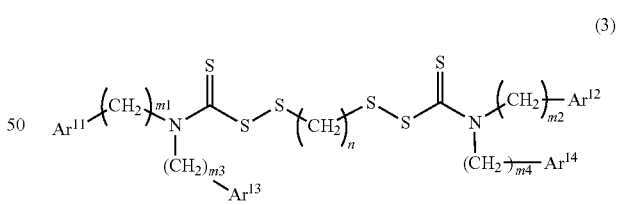

(3)

In the formula (3), $Ar^{11}$ to $Ar^{14}$ each independently represent a monovalent aryl group having 6 to 12 carbon atoms, n represents an integer of 2 to 12, m1 to m4 each independently represent an integer of 1 to 6, and $Ar^{11}$ to $Ar^{14}$ each may independently further have a substituent.

The monovalent aryl group having 6 to 12 carbon atoms represented by $Ar^{11}$ to $Ar^{14}$ includes a phenyl group, and a naphthyl group. Above all, an aryl group having 6 to 10 carbon atoms is preferred, and a phenyl group is more preferred.

n is preferably 3 to 12, more preferably 4 to 10.

m1 to m4 each are independently preferably 1 to 4, more preferably 1 to 2.

The substituent that $Ar^{11}$ to $Ar^{14}$ may have includes the groups and the atoms mentioned hereinabove as a substituent that $R^1$ to $R^5$ may further have.

Commercial products may be used as the compound represented by the formula (1), and for example, "VULCUREN KA9188" (1,6-bis(N,N-dibenzylthiacarbamoylthio)hexane), a trade name by LANXESS is available.

In the rubber composition of the present invention, the total amount of all vulcanization accelerators of the compound represented by the formula (1) and the other vulcanization accelerator than the compound represented by the formula (1) is 1.3 to 2.0 parts by mass relative to 100 parts by mass of the rubber component. When the total amount of all vulcanization accelerators is less than 1.3 parts by mass relative to 100 parts by mass of the rubber component, the rubber composition is not excellent in storage stability, and even when the total amount is more than 2.0 parts by mass, the rubber composition is not also excellent in storage stability.

The total amount of all vulcanization accelerators is preferably 1.3 to 1.8 parts by mass relative to 100 parts by mass of the rubber component.

The content of the compound represented by the formula (1) in the rubber composition is, from the viewpoint of increasing the vulcanization rate of the rubber composition in repairing vulcanized rubber such as tires, preferably 0.01 to 5 parts by mass relative to 100 parts by mass of the rubber component, more preferably 0.05 to 1 part by mass, even more preferably 0.08 to 0.6 parts by mass.

[Vulcanization Accelerator Except Compound Represented by the Formula (1)]

The rubber composition of the present invention contains a vulcanization accelerator except the compound represented by the formula (1) for more accelerating vulcanization of the rubber component.

Specifically, examples thereof include guanidine-based, aldehyde-amine-based, aldehyde-ammonia-based, thiazole-based, sulfenamide-based, thiourea-based, dithiocarbamate-based and xanthate-based vulcanization accelerators, and thiuram-based vulcanization accelerators except the compounds represented by the formula (1).

Among the above, the rubber composition preferably contains at least one of a sulfenamide-based vulcanization accelerator and a thiazole-based vulcanization accelerator.

The content of the vulcanization accelerator except the compound represented by the formula (1) in the rubber composition is, from the viewpoint of more enhancing storage stability, preferably 0.5 to 5 parts by mass relative to 100 parts by mass of the rubber component, more preferably 0.7 to 3 parts by mass, even more preferably 0.8 to 2 parts by mass.

(Sulfenamide-Based Vulcanization Accelerator)

The sulfenamide-based vulcanization accelerator includes N-cyclohexyl-2-benzothiazolylsulfenamide, N,N-dicyclohexyl-2-benzothiazolylsulfenamide, N-tert-butyl-2-benzothiazolylsulfenamide, N-oxydiethylene-2-benzothiazolylsulfenamide, N-methyl-2-benzothiazolylsulfenamide, N-ethyl-2-benzothiazolylsulfenamide, N-propyl-2-benzothiazolylsulfenamide, N-butyl-2-benzothiazolylsulfenamide, N-pentyl-2-benzothiazolylsulfenamide, N-hexyl-2-benzothiazolylsulfenamide, N-heptyl-2-benzothiazolylsulfenamide, N-octyl-2-benzothiazolylsulfenamide, N-2-ethylhexyl-2-benzothiazolylsulfenamide, N-decyl-2-benzothiazolylsulfenamide, N-dodecyl-2-benzothiazolylsulfenamide, N-stearyl-2-benzothiazolylsulfenamide, N,N-diethyl-2-benzothiazolylsulfenamide, N,N-dipropyl-2-benzothiazolylsulfenamide, N,N-dibutyl-2-benzothiazolylsulfenamide, N,N-dipentyl-2-benzothiazolylsulfenamide, N,N-dihexyl-2-benzothiazolylsulfenamide, N,N-diheptyl-2-benzothiazolylsulfenamide, N,N-dioctyl-2-benzothiazolylsulfenamide, N,N-di-2-ethylhexylbenzothiazolylsulfenamide, N,N-didecyl-2-benzothiazolylsulfenamide, N,N-didodecyl-2-benzothiazolylsulfenamide, and N,N-distearyl-2-benzothiazolylsulfenamide.

Among these, from the viewpoint of reactivity N-cyclohexyl-2-benzothiazolylsulfenamide, and N-tert-butyl-2-benzothiazolylsulfenamide are preferred, and N-cyclohexyl-2-benzothiazolylsulfenamide is more preferred.

(Thiazole-Based Vulcanization Accelerator)

The thiazole-based vulcanization accelerator includes 2-mercaptobenzothiazole, di-2-benzothiazolyl disulfide, 2-mercaptobenzothiazole zinc salt, 2-mercaptobenzothiazole cyclohexylamine salt, 2-(N,N-diethylthiocarbamoylthio) benzothiazole, 2-(4'-morpholinodithio)benzothiazole, 4-methyl-2-mercaptobenzothiazole, di(4-methyl-2-benzothiazolyl) disulfide, 5-chloro-2-mercaptobenzothiazole, 2-mercaptobenzothiazole sodium, 2-mercapto-6-nitrobenzothiazole, 2-mercapto-naphtho[1,2-d]thiazole, 2-mercapto-5-methoxybenzothiazole, and 6-amino-2-mercaptobenzothiazole. As having high reactivity, 2-mercaptobenzothiazole and di-2-benzothiazolyl disulfide are preferred.

(Thiuram-Based Vulcanization Accelerator)

Examples of the vulcanization accelerator except the compound represented by the formula (1) include tetrakis (2-ethylhexyl)thiuram disulfide, tetrabutylthiuram disulfide, tetrakis(n-dodecyl)thiuram disulfide, and tetrabenzylthiuram disulfide, and among these, tetrakis(2-ethylhexyl)thiuram disulfide and tetrabenzylthiuram disulfide are preferred.

For more accelerating vulcanization of the rubber component, more preferably the rubber composition of the present invention contains a thiazole-based compound having two benzothiazolyl groups as a thiazole-based vulcanization accelerator. Examples of the thiazole-based compound having two benzothiazolyl groups include di-2-benzothiazolyl disulfide.

Further, more accelerating vulcanization of the rubber component, the ratio (a/b) of the content (a) of the compound represented by the formula (1) to the content (b) of the thiazole-based compound having two benzothiazolyl group is preferably 0.3 to 1.7, more preferably 0.5 to 1.7, even more preferably 0.5 to 1.5.

The guanidine-based vulcanization accelerator includes 1,3-diphenylguanidine; and the dithiocarbamate-based vulcanization accelerator includes dibenzyl dithiocarbamate.

[Compound Represented by Formula (2)]

The rubber composition of the present invention contains a compound represented by the formula (2).

Containing a compound represented by the formula (2), the rubber composition can be protected from being vulcanized until use for repairing vulcanized rubber such as tires after distribution in the market, and can be therefore kept soft, that is, the storage stability of the rubber composition can be thereby enhanced.

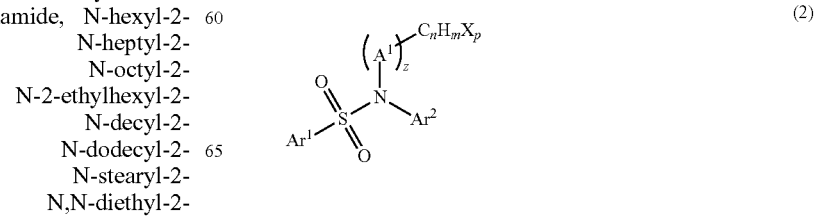

(2)

In the formula (2), $A^1$ represents a divalent hetero atom, X represents a halogen atom, and two or more X's, if any, may be the same as or different from each other; z represents an integer of 0 to 5, n represents an integer of 1 to 5, m represents an integer of 0 or more, p represents an integer of 1 or more, provided that m+p=2n+1, and $Ar^1$ and $Ar^2$ each independently represent a monovalent aryl group having 6 to 15 carbon atoms which may further have a substituent.

The divalent hetero atom represented by $A^1$ includes an oxygen atom and a sulfur atom, and above all, a sulfur atom is preferred.

z is preferably 1 to 5, more preferably 1 to 3, even more preferably 1.

n is preferably 1 to 3, more preferably 1 to 2, even more preferably 1.

m is preferably 0 to 6, more preferably 0 to 4, even more preferably 0 to 2, further more preferably 0.

The halogen atom represented by X includes a fluorine atom, a chlorine atom, a bromine atom and an iodine atom, and above all, a chlorine atom and a bromine atom are preferred, and a chlorine atom is more preferred.

Two or more X's are preferably the same.

p is preferably 1 to 7, more preferably 1 to 5, even more preferably 1 to 3.

The monovalent aryl group having 6 to 15 carbon atoms represented by Ar and $Ar^2$ includes a phenyl group, a naphthyl group, an anthracenyl group, and a phenanthrenyl group.

The carbon number of the aryl group is preferably 6 to 12, more preferably 6 to 10.

For the substituents that $Ar^1$ and $Ar^2$ may further have, there are mentioned the groups and the atoms described hereinabove as the substituent that $R^1$ to $R^5$ may further have.

Preferably the compound represented by the formula (2) is represented by the formula (4).

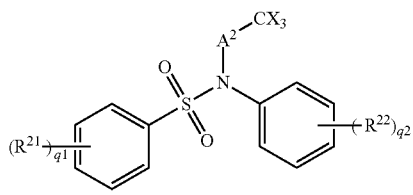

(4)

In the formula (4), $A^2$ represents an oxygen atom or a sulfur atom, X represents a halogen atom, three X's may be the same as or different from each other, $R^{21}$ and $R^{22}$ each independently represent an amino group or an alkyl group having 1 to 8 carbon atoms which may further have a substituent, and q1 and q2 each independently represent an integer of 0 to 5.

$A^2$ is preferably a sulfur atom.

X has the same meaning as that of X in the formula (2), and is preferably a chlorine atom or a bromine atom, more preferably a chlorine atom.

The alkyl group having 1 to 8 carbon atoms represented by $R^{21}$ and $R^{22}$ may be linear, branched or cyclic. Specifically examples thereof include a methyl group, an ethyl group, a propyl group, an isopropyl group, a n-butyl group, a tert-butyl group, a hexyl group, a cyclohexyl group and a n-octyl group.

The alkyl group represented by $R^{21}$ and $R^{22}$ is preferably linear or branched, more preferably linear. The carbon number of the alkyl group is preferably 1 to 6, more preferably 1 to 3, even more preferably 1 to 2.

q1 and q2 each independently preferably 0 to 3, more preferably 0 to 2, even more preferably 0 to 1, further more preferably 0.

Commercial products may be used as the compound represented by the formula (2), and for example, "Vulkalent E/C" (N-phenyl-N-(trichloromethylthio)benzenesulfonamide), a trade name by LANXESS is available.

The content of the compound represented by the formula (2) in the rubber composition is, from the viewpoint of enhancing the storage stability of the rubber composition until use thereof for repairing vulcanized rubber such as tires after preparation of the rubber composition, preferably 0.01 to 5 parts by mass relative to 100 parts by mass of the rubber component, more preferably 0.05 to 2 parts by mass, even more preferably 0.08 to 1.0 part by mass.

[Tackifier]

Preferably the rubber composition of the present invention further contains a tackifier.

The rubber composition of the present invention is applied to a chipped vulcanized rubber or to a defective part of a tire worn to have a hole, and then vulcanized to be integrated with each product. When the rubber composition contains a tackifier, the adhesiveness between the defective part of vulcanized rubber and the rubber composition to be applied thereto enhances, and therefore the damaged vulcanized rubber part and the vulcanized rubber derived from the rubber composition of the present invention can be adhered more firmly.

Examples of the tackifier include rosin-based resins such as rosin esters, hydrogenated rosin esters, disproportionated rosin esters, and polymerized rosin esters; chromane-indene-based resins such as chromane-indene resins, hydrogenated chromane-indene resins, phenol-modified chromane-indene resins, and epoxy-modified chromane-indene reins; terpene-based resins such as polyterpene resins, styrene-modified terpene resins, and phenol-modified terpene resins; phenolic resins such as alkylphenol resins, alkylphenol-formaldehyde resins, phenol-formaldehyde resins, and p-tert-butylphenol-acetylene resins; and petroleum-based resins such as aliphatic petroleum resins, aromatic petroleum resins, aromatic-modified aliphatic petroleum resins, and aromatic pure monomer resins.

One kind alone or two or more kinds of these tackifiers may be used.

The tackifier for use in the rubber composition of the present invention is preferably a phenolic resin.

The content of the tackifier in the rubber composition is preferably more than 2.0 parts by mass and 10 parts by mass or less relative to 100 parts by mass of the rubber component therein.

When the content of the tackifier is more than 2.0 parts by mass relative to 100 parts by mass of the rubber component, the adhesiveness between the damaged vulcanized rubber part and the rubber composition applied thereto increases more, and the damaged vulcanized rubber part and the vulcanized rubber derived from the rubber composition of the present invention can be thereby more firmly adhered.

When the content of the tackifier is 10 parts by mass or less relative to 100 parts by mass of the rubber component, the rubber composition can be prevented from being sticky to metal, and therefore the workability with the tackifier-containing rubber composition in conveyance and kneading thereof using a metal roller-having apparatus is excellent.

The content of the tackifier in the rubber composition is more preferably 2.3 to 8 parts by mass relative to 100 parts by mass of the rubber component, even more preferably 2.3 to 4.9 parts by mass, further more preferably 2.6 to 4.7 parts by mass.

The rubber composition of the present invention may optionally contain, as needed along with the above-mentioned rubber component, a filler, a vulcanizing agent, a compound represented by the formula (1) and a compound represented by the formula (2), any other compounding chemicals generally used in the rubber industry for example, a softener, a stearic acid, an antiaging agent, and a zinc oxide within a range not detracting from the object of the present invention.

In repairing a damaged vulcanized rubber, preferably, the defective part of vulcanized rubber is polished in order to make the rubber composition of the present invention readily adhere to the defective part and after vulcanization, in order to secure adhesion between the vulcanized rubber derived from the rubber composition and the defective part of the damaged vulcanized rubber.

After applied to a defective part, the rubber composition of the present invention is vulcanized, and the vulcanization temperature in vulcanizing is, from the viewpoint of preventing overvulcanization of the vulcanized rubber of the damaged product, preferably 100 to 130° C.

<Rubber Composition for Tires>

The rubber composition for tires of the present invention uses the rubber composition of the invention.

The rubber composition for tires of the present invention can be used for new production of tires or for repair of tires.

The rubber composition for tires of the present invention is not spontaneously vulcanized after production and distribution in the market and during storage, and is flexible and well workable and has excellent storage stability while on the other hand, in use thereof, the rubber composition exhibits a high vulcanization rate and can be rapidly vulcanized, and is therefore especially favorable as a rubber composition for repairing tires.

<Tire>

The tire of the present invention uses the rubber composition for tires of the invention.

The tire of the present invention may be a tire newly produced using the rubber composition for tires of the invention, but is preferably a retreaded tire that has been repaired by applying the rubber composition for tires of the invention to a defective part of a tire.

For repairing a damaged tire, preferably the defective part of the tire is polished in order that the rubber composition for tires of the invention can readily stick to the defective part of the tire, and in order that, after vulcanization, the vulcanized rubber derived from the rubber composition of the invention can readily adhere to the defective part of the damaged tire.

The vulcanization temperature is, from the viewpoint of preventing overvulcanization of the vulcanized rubber of a damaged tire, preferably 100 to 130° C.

EXAMPLES

Examples 1 to 7 and Comparative Examples 1 to 12

[Preparation of Rubber Composition]

Constituent components are kneaded in a compounding formulation as shown in Tables 1 to 3 below, to prepare a rubber composition.

Details of the components in the Tables are as mentioned below.

1. Rubber Component
   (1) NR: natural rubber, RSS #1
   (2) SBR: "NIPOL1502" from ZEON Corporation
   (3) BR: polybutadiene rubber, trade name "BR01" from JSR Corporation
2. Filler
   Carbon black: N220, from Asahi Carbon Co., Ltd., trade name "#80"
3. Tackifier
   Alkylphenol resin: novolak-type alkylphenol resin, from Hitachi Chemical Industry Ltd., trade name "Hitanol 1502"
4. Vulcanization Accelerator
   (1) 1,3-Diphenylguanidine (DPG), from Ouchi Shinko Chemical Industrial Co., Ltd., trade name "Nocceler D"
   (2) Di-2-benzothiazolyl disulfide (DM), from Ouchi Shinko Chemical Industrial Co., Ltd., trade name "Nocceler DM" (thiazole-based compound having two benzothiazolyl groups)
   (3) N-cyclohexyl-2-benzothiazolylsulfenamide (CZ), from Ouchi Shinko Chemical Industrial Co., Ltd., trade name "Nocceler CZ-G"
   (4) Compound represented by formula (1), 1,6-bis(N,N-dibenzylthiacarbamoylthio)hexane, from LANXESS, trade name "VULCUREN KA9188"
   (5) Zinc dibenzyldithiocarbamate (ZTC), from Ouchi Shinko Chemical Industrial Co., Ltd., trade name "Nocceler ZTC"
   (6) Tetrakis(2-ethylhexyl)thiuram disulfide (TOT), from Ouchi Shinko Chemical Industrial Co., Ltd., trade name "Nocceler TOT-N"
   (7) Tetrabenzylthiuram disulfide (TBZTD), from Sanshin Chemical Industry Co., Ltd., trade name "Sanceler TBZTD"
5. Vulcanization Accelerator
   Compound represented by formula (2): N-phenyl-N-(trichloromethylthio)benzenesulfonamide, from LANXESS, trade name "Vulkalent E/C"
6. Vulcanizing Agent
   Sulfur: insoluble sulfur, from Flexes Corporation, trade name "Crystex HS OT-20)
7. Various Components
   Stearic acid: from New Japan Chemical Co., Ltd., trade name "Stearic Acid 50S"
   Zinc oxide: from Hakusui Tech Corporation, trade name "No. 3 Zinc Oxide"
   Antiaging agent: N-phenyl-N'-(1,3-dimethylbutyl)-p-phenylenediamine, from Ouchi Shinko Chemical Industrial Co., Ltd., trade name "Nocrac 6C"

TABLE 1

| Rubber Component | Amount shown in Table 2 or 3 |
|---|---|
| Filler (carbon black) | 40 |
| Tackifier | Amount shown in Table 2 or 3 |
| Vulcanization Accelerator | Amount shown in Table 2 or 3 |
| Vulcanization Retarder | Amount shown in Table 2 or 3 |
| Vulcanizing Agent (sulfur) | 3 |
| Stearic Acid | 2 |
| Zinc Oxide | 6 |
| Antiaging Agent | 3 |

(part by mass)

[Evaluation of Rubber Composition]
1. Evaluation of Vulcanization Rate (T0.1, T0.9)

After preparation in Examples and Comparative Examples, each rubber composition is tested using a rheometer (RLR-4) from Toyo Seiki Manufacturing Co., Ltd., and from the vulcanization curve (torque) at 100° C. measured according to JIS K6300-2:2001, T0.1 [induction time (vulcanization start point)] (min) and T0.9 [vulcanization time (optimum vulcanization point)] (min) are derived.

T0.1 is a time (min) until the torque reaches 0.1 times the maximum torque of the sample on the vulcanization curve measured using a rheometer, and T0.9 is a time (min) until the torque reached 0.9 times the maximum torque.

The measured value in Example 1 is standardized as 100, and the measured values in Examples 2 to 7 and Comparative Examples 1 to 12 are indexed. The results are shown in Tables 2 and 3.

A larger index value of T0.1 means better, and a smaller index value of T0.9 means better.

2. Evaluation of Storage Stability

The index value of T0.1 and the index value of T0.9 determined in the previous vulcanization rate evaluation are referred to as "index value of T0.1 immediately after preparation", and "index value of T0.9 immediately after preparation", respectively. Next, according to the test mentioned below, "index value of T0.1 after storage" and "index value of T0.9 after storage" are determined.

Specifically after preparation in Examples and Comparative Examples, each rubber composition is left at 40° C. for 30 minutes. Subsequently each rubber composition is tested using a rheometer (RLR-4) from Toyo Seiki Manufacturing Co., Ltd., and from the vulcanization curve (torque) at 100° C. measured according to JIS K6300-2:2001, T0.1 [induction time (vulcanization start point)] (min) and T0.9 [vulcanization time (optimum vulcanization point)] (min) are derived.

The measured value in Example 1 is standardized as 100, and the measured values in Examples 2 to 7 and Comparative Examples 1 to 12 are indexed to be "index value of T0.1 after storage", and "index value of T0.9 after storage".

In Examples 1 to 7 and Comparative Examples 1 to 12, using "index value of T0.1 immediately after preparation", "index value of T0.9 immediately after preparation", "index value of T0.1 after storage", and "index value of T0.9 after storage", T0.1 change rate and T0.9 change rate are calculated according to the following equations.

$$T0.1 \text{ change rate} = [(100 - \text{index value of } T0.1 \text{ after storage}) / \text{index value of } T0.1 \text{ immediately after preparation}] \times 100$$

$$T0.9 \text{ change rate} = [(100 - \text{index value of } T0.9 \text{ after storage}) / \text{index value of } T0.9 \text{ immediately after preparation}] \times 100$$

T0.1 change rate and T0.9 change rate that are nearer to 0 (zero) mean that the tested samples are more excellent in storage stability. The results are shown in Tables 2 and 3.

3. Evaluation of Tackiness (Tackiness Between Rubber-Rubber, Rubber-Metal)

Tackiness of the rubber composition of Examples and Comparative Examples to a vulcanized rubber block, and tackiness thereof to a metal plate are measured at room temperature using a pickup-type tackiness meter (from Toyo Seiki Manufacturing Co., Ltd., trade name "PICMA Tack Tester").

Here, the vulcanized rubber block is prepared by cutting out from a tread rubber of a used tire. As the metal plate, a copper metal plate having a flat and smooth surface and having a thickness of 10 mm is used.

The measured value in Example 2 is standardized as 100, and the measured values in Examples 2 to 7 and Comparative Examples 1 to 12 are indexed. The results are shown in Tables 2 and 3.

Regarding the index value between rubber-rubber, a larger value means that the rubber composition more readily adheres to the vulcanized rubber, and regarding the index value between rubber-metal, a smaller value means that the rubber composition hardly adheres to a metal member and is excellent in workability.

4. Peeling Strength Test

The surface of a vulcanized rubber block used for tackiness evaluation is partly scooped, then each rubber composition of Examples and Comparative Examples is buried thereinto, and vulcanized and integrated.

A sample piece including an interface between the vulcanized rubber block surface and the vulcanized rubber surface derived from each rubber composition of Examples and Comparative Examples is cut out, and tested according to a peeling adhesion strength test of JIS K 6854 (1999) to measure the peeling strength.

Specifically, the sample piece is pulled in a 180-degree direction under the condition of a tension rate of 50 mm/min to measure the peeling strength (N/25 mm).

The measured value in Example 2 is standardized as 100, and the measured values in Examples 2 to 7 and Comparative Examples 1 to 12 are indexed. The results are shown in Tables 2 and 3.

When the index value of each sample is smaller than the index value in Example 2, the sample was evaluated as "having a small peeling strength".

TABLE 2

| | | Comparative Example | | | | | | | | |
|---|---|---|---|---|---|---|---|---|---|---|
| | | 1 | 2 | 3 | 4 | 5 | 6 | 7 | 8 | 9 |
| Rubber Component | NR | 100 | 100 | 100 | 100 | 100 | 100 | 100 | 100 | 100 |
| Tackifier | Alkylphenol Resin | — | — | — | 3 | 3 | 3 | 3 | 3 | 3 |
| Vulcanization Accelerator | 1,3-Diphenylguanidine | 0.3 | 0.3 | 0.3 | 0.3 | 0.3 | 0.3 | 0.3 | 0.3 | 0.3 |
| | Di-2-benzothiazolyl disulfide (b) | 0.6 | 0.6 | 0.6 | 0.6 | 0.6 | 0.6 | 0.6 | 0.6 | 0.6 |
| | N-cyclohexyl-2-benzothiazolylsulfenamide | 0.6 | 0.6 | 0.1 | 0.1 | 0.1 | 0.1 | 0.1 | 0.1 | 0.1 |
| | Compound represented by formula (1) (a) | — | — | 0.1 | 0.3 | — | — | — | 0.1 | 1.1 |
| | Zinc dibenzyldithiocarbamate | — | — | — | — | 0.3 | — | — | — | — |
| | Tetrakis(2-ethylhexyl)thiuram disulfide | — | — | — | — | — | 0.3 | — | — | — |
| | Tetrabenzylthiuram disulfide | — | — | — | — | — | — | 0.3 | — | — |
| | Total content of vulcanization accelerators | 1.5 | 1.5 | 1.1 | 1.3 | 1.3 | 1.3 | 1.3 | 1.1 | 2.1 |
| | Content ratio (a)/(b) | — | — | 0.17 | 0.5 | — | — | — | 0.2 | 1.8 |
| Vulcanization Retarder | Compound represented by formula (2) | — | 0.1 | — | — | 0.1 | 0.1 | 0.1 | 0.1 | 0.1 |
| Vulcanization Rate | T0.1 | 90 | 103 | 85 | 85 | 110 | 110 | 110 | 103 | 95 |
| | T0.9 | 90 | 110 | 95 | 90 | 115 | 115 | 115 | 110 | 75 |

TABLE 2-continued

|  |  | Comparative Example | | | | | | | | |
|---|---|---|---|---|---|---|---|---|---|---|
|  |  | 1 | 2 | 3 | 4 | 5 | 6 | 7 | 8 | 9 |
| Storage Stability | T0.1 change rate | 20 | 5 | 17 | 20 | 0 | 0 | 0 | 5 | 10 |
|  | T0.9 change rate | 20 | 5 | 17 | 20 | 0 | 0 | 0 | 5 | 10 |
| Tackiness | rubber-rubber | 60 | 60 | 60 | 100 | 100 | 100 | 100 | 100 | 100 |
|  | rubber-metal | 80 | 80 | 80 | 100 | 100 | 100 | 100 | 100 | 100 |
| Peeling Strength | — | 80 | 80 | 70 | 80 | 100 | 100 | 100 | 100 | 100 |

TABLE 3

|  |  | Comparative Example | | | Example | | | | | | |
|---|---|---|---|---|---|---|---|---|---|---|---|
|  |  | 10 | 11 | 12 | 1 | 2 | 3 | 4 | 5 | 6 | 7 |
| Rubber Component | NR | 100 | 100 | 100 | 100 | 100 | 80 | 80 | 100 | 100 | 100 |
|  | SBR | — | — | — | — | — | 20 | — | — | — | — |
|  | BR | — | — | — | — | — | — | 20 | — | — | — |
| Tackifier | Alkylphenol Resin | 3 | 3 | 3 | 2.5 | 3 | 3 | 3 | 5 | 10 | — |
| Vulcanization Accelerator | 1,3-Diphenylguanidine | 0.3 | 0.3 | 0.3 | 0.3 | 0.3 | 0.3 | 0.3 | 0.3 | 0.3 | 0.3 |
|  | Di-2-benzothiazolyl disulfide (b) | 0.6 | 1.5 | 0.15 | 0.6 | 0.6 | 0.6 | 0.6 | 0.6 | 0.6 | 0.6 |
|  | N-cyclohexyl-2-benzothiazolylsulfenamide | 0.1 | 0.1 | 0.1 | 0.1 | 0.1 | 0.1 | 0.1 | 0.1 | 0.1 | 0.1 |
|  | Compound represented by formula (1) (a) | 1.3 | 0.3 | 0.3 | 0.3 | 0.3 | 0.3 | 0.3 | 0.3 | 0.3 | 0.3 |
|  | Total content of vulcanization accelerators | 2.3 | 2.2 | 0.85 | 1.3 | 1.3 | 1.3 | 1.3 | 1.3 | 1.3 | 1.3 |
|  | Content ratio (a)/(b) | 2.2 | 0.2 | 2 | 0.5 | 0.5 | 0.5 | 0.5 | 0.5 | 0.5 | 0.5 |
| Vulcanization Retarder | Compound represented by formula (2) | 0.1 | 0.1 | 0.1 | 0.1 | 0.1 | 0.1 | 0.1 | 0.1 | 0.1 | 0.1 |
| Vulcanization Rate | T0.1 | 85 | 85 | 105 | 100 | 100 | 100 | 100 | 100 | 100 | 100 |
|  | T0.9 | 70 | 80 | 110 | 100 | 100 | 100 | 100 | 100 | 100 | 100 |
| Storage Stability | T0.1 change rate | 20 | 10 | 5 | 0 | 0 | 0 | 0 | 0 | 0 | 0 |
|  | T0.9 change rate | 20 | 10 | 5 | 0 | 0 | 0 | 0 | 0 | 0 | 0 |
| Tackiness | rubber-rubber | 100 | 100 | 100 | 90 | 100 | 100 | 100 | 130 | 180 | 60 |
|  | rubber-metal | 100 | 100 | 100 | 95 | 100 | 100 | 100 | 150 | 200 | 80 |
| Peeling Strength | — | 90 | 85 | 100 | 95 | 100 | 100 | 100 | 110 | 125 | 90 |

From Tables 1 and 2, it is known that the rubber compositions of Comparative Examples not containing a compound represented by the formula (1) or those containing a compound represented by the formula (1) in which, however, the total amount of all vulcanization accelerators including the compound represented by the formula (1) therein is outside a range of 1.3 to 2.0 parts by mass relative to 100 parts by mass of the rubber component are not excellent in storage stability as in Comparative Examples 1 to 4 and 8 to 12, or though excellent in storage stability as in Comparative Examples 5 to 7, vulcanization thereof could hardly finish in use (T0.9 index is large) and therefore rapid vulcanization could not be attained.

On the other hand, the rubber compositions of Examples have both a small T0.1 change rate and a small T0.9 change rate and are therefore excellent in storage stability and in addition, since these have a large T0.1 and a small T0.9, it is known that the rubber compositions of Examples have a high vulcanization rate and can be therefore rapidly vulcanized in use.

INDUSTRIAL APPLICABILITY

The rubber composition of the present invention can be kept unvulcanized even though left as such for a long period of time from preparation to distribution thereof in the market and during storage in the market, and therefore can have excellent storage stability as flexible and well workable, while on the other hand, in use thereof, the vulcanization rate is large and the rubber composition can be rapidly vulcanized, and consequently the rubber composition of the present invention can be favorably used especially for repairing vulcanized rubber, especially tires in small-sized maintenance shops and retail shops not equipped with facilities.

The invention claimed is:

1. A rubber composition comprising a rubber component that contains at least one type of a dienic rubber,
a filler,
a vulcanizing agent,
a compound represented by a formula (1),
a compound represented by a formula (2), and
a vulcanization accelerator except the compound represented by the formula (1),
wherein the total amount of the vulcanization accelerator and the compound represented by the formula (1) is 1.3 to 2.0 parts by mass relative to 100 parts by mass of the rubber component,
the amount of the compound represented by the formula (1) is 0.01 to 0.3 parts by mass relative to 100 parts by mass of the rubber component, the vulcanization accelerator contains a thiazole-based vulcanization accelerator, and
the thiazole-based vulcanization accelerator contains a thiazole-based compound having two benzothiazolyl groups, and the ratio of the content (a) of the compound represented by the general formula (1) to the content (b) of the thiazole-based compound having two benzothiazolyl groups (a/b) is 0.5 to 1.7:

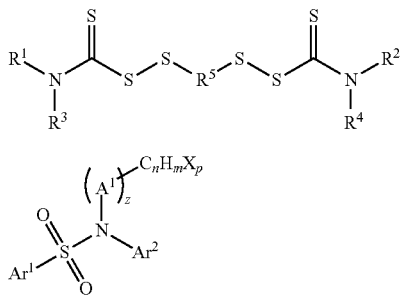

(1)

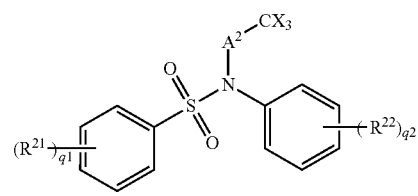

(2)

wherein in the formula (1), $R^1$ to $R^4$ each independently represent a monovalent alkyl group having 1 to 18 carbon atoms, or a monovalent aryl group having 6 to 15 carbon atoms, $R^5$ represents a divalent alkyl group having 2 to 18 carbon atoms, and $R^1$ to $R^5$ may each independently further have a substituent; and in the formula (2), $A^1$ represents a divalent hetero atom, X represents a halogen atom, and two or more X's, if any, may be the same as or different from each other, z represents an integer of 0 to 5, n represents an integer of 1 to 5, m represents an integer of 0 or more, p represents an integer of 1 or more, provided that m+p=2n+1, and $Ar^1$ and $Ar^2$ each independently represent a monovalent aryl group having 6 to 15 carbon atoms which may further have a substituent.

2. The rubber composition according to claim 1, further comprising a tackifier.

3. The rubber composition according to claim 2, wherein the content of the tackifier is more than 2.0 parts by mass and 10 parts by mass or less relative to 100 parts by mass of the rubber component.

4. The rubber composition according to claim 2, wherein the vulcanization accelerator further contains a sulfenamide-based vulcanization accelerator.

5. The rubber composition according to claim 2, wherein the rubber component contains a natural rubber, and the proportion of the natural rubber in the rubber component is 75% by mass or more.

6. The rubber composition according to claim 5, wherein the proportion of the natural rubber in the rubber component is 100%.

7. The rubber composition according claim 2, wherein the vulcanizing agent is sulfur.

8. The rubber composition according to claim 2, wherein the compound represented by the formula (1) is represented by the following formula (3):

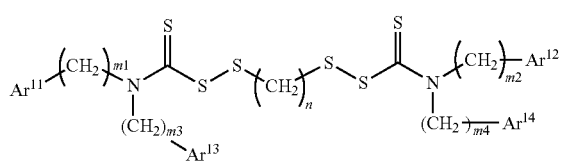

(3)

wherein in the formula (3), $Ar^{11}$ to $Ar^{14}$ each independently represent a monovalent aryl group having 6 to 12 carbon atoms, n represents an integer of 2 to 12, m1 to m4 each independently represent an integer of 1 to 6, and $Ar^{11}$ to $Ar^{14}$ each may independently further have a substituent.

9. The rubber composition according to claim 2, wherein the compound represented by the formula (2) is represented by the following formula (4):

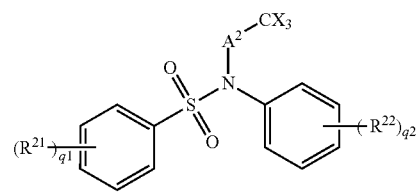

(4)

wherein in the formula (4), $A^2$ represents an oxygen atom or a sulfur atom, X represents a halogen atom, three X's may be the same as or different from each other, $R^{21}$ and $R^{22}$ each independently represent an amino group or an alkyl group having 1 to 8 carbon atoms which may further have a substituent, and q1 and q2 each independently represent an integer of 0 to 5.

10. The rubber composition according to claim 1, wherein the vulcanization accelerator further contains a sulfenamide-based vulcanization accelerator.

11. The rubber composition according to claim 1, wherein the rubber component contains a natural rubber, and the proportion of the natural rubber in the rubber component is 75% by mass or more.

12. The rubber composition according to claim 11, wherein the proportion
of the natural rubber in the rubber component is 100%.

13. The rubber composition according to claim 1, wherein the vulcanizing agent is sulfur.

14. The rubber composition according to claim 1, wherein the compound represented by the formula (1) is represented by the following formula (3):

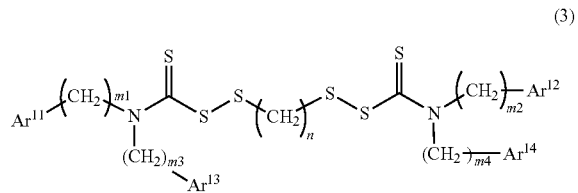

(3)

wherein in the formula (3), $Ar^{11}$ to $Ar^{14}$ each independently represent a monovalent aryl group having 6 to 12 carbon atoms, n represents an integer of 2 to 12, m1 to m4 each independently represent an integer of 1 to 6, and $Ar^{11}$ to $Ar^{14}$ each may independently further have a substituent.

15. The rubber composition according to claim 1, wherein the compound represented by the formula (2) is represented by the following formula (4):

wherein in the formula (4), $A^2$ represents an oxygen atom or a sulfur atom, X represents a halogen atom, three X's may be the same as or different from each other, $R^{21}$ and $R^{22}$ each independently represent an amino group or an alkyl group having 1 to 8 carbon atoms which may further have a substituent, and q1 and q2 each independently represent an integer of 0 to 5.

16. A tire comprising the rubber composition of claim 1.

\* \* \* \* \*